United States Patent
Hurvitz

(10) Patent No.: US 10,127,158 B2
(45) Date of Patent: Nov. 13, 2018

(54) MEMORY MANAGEMENT USING VIRTUAL ADDRESS MASKING

(71) Applicant: Oracle International Corporation, Redwood Shores, CA (US)

(72) Inventor: Amit Hurvitz, Tel Aviv (IL)

(73) Assignee: Oracle International Corporation, Redwood Shores, CA (US)

( * ) Notice: Subject to any disclaimer, the term of this patent is extended or adjusted under 35 U.S.C. 154(b) by 120 days.

(21) Appl. No.: 15/235,595

(22) Filed: Aug. 12, 2016

(65) Prior Publication Data
US 2017/0115923 A1    Apr. 27, 2017

Related U.S. Application Data

(60) Provisional application No. 62/247,151, filed on Oct. 27, 2015.

(51) Int. Cl.
*G06F 12/02* (2006.01)
*G06F 12/10* (2016.01)
*G06F 12/109* (2016.01)

(52) U.S. Cl.
CPC ............ *G06F 12/10* (2013.01); *G06F 12/023* (2013.01); *G06F 12/109* (2013.01); *G06F 2212/1016* (2013.01); *G06F 2212/657* (2013.01); *G06F 2212/68* (2013.01)

(58) Field of Classification Search
USPC ........................................................ 711/170
See application file for complete search history.

(56) References Cited

U.S. PATENT DOCUMENTS

| | | | | |
|---|---|---|---|---|
| 5,899,994 A | * | 5/1999 | Mohamed | G06F 12/1036 707/700 |
| 6,154,823 A | * | 11/2000 | Benayon | G06F 12/023 711/170 |
| 2005/0097296 A1 | * | 5/2005 | Chamberlain | G06F 12/023 711/170 |
| 2006/0161759 A1 | * | 7/2006 | Hillier, III | G06F 12/0284 711/202 |
| 2012/0246437 A1 | * | 9/2012 | Radovic | G06F 12/02 711/170 |
| 2014/0281336 A1 | * | 9/2014 | Solihin | G06F 12/0223 711/170 |
| 2015/0032986 A1 | * | 1/2015 | Moore | G06F 9/00 711/171 |

OTHER PUBLICATIONS

Phillips, S.; "M7: Next Generation SPARC", Hotchips 26—Aug. 12, 2014 (27 pages).

* cited by examiner

*Primary Examiner* — Shawn X Gu
*Assistant Examiner* — Jean C Edouard
(74) *Attorney, Agent, or Firm* — Ferguson Braswell Fraser Kubasta PC

(57) ABSTRACT

A method for memory management may include dividing a memory into pools. Each pool includes blocks. The method may further include receiving a request to allocate a first block of a first size, selecting a pool based on the first size, allocating the first block from the selected pool, and creating metadata for a pointer to the first block. The pointer includes a pre-normalized address of the first block. The method may further include storing the metadata in the pointer, receiving a request to free the first block, and freeing the first block using the metadata to identify the selected pool.

18 Claims, 5 Drawing Sheets

MEMORY MANAGEMENT USING VIRTUAL ADDRESS MASKING

CROSS-REFERENCE TO RELATED APPLICATIONS

This application claims benefit of U.S. Provisional Application Ser. No. 62/247,151 entitled "OPTIMIZED VIRTUAL ADDRESS MASKING," filed on Oct. 27, 2015 in the name of Amit Hurvitz.

BACKGROUND

Freeing blocks of memory that are no longer needed by an application program may become a performance hotspot that degrades performance due to memory accesses (e.g., triggered by cache misses and page faults) required to identify the pool containing the block to be freed. Some approaches to reducing memory management overhead are aimed at caching data that is likely to be referenced during operations that allocate and free memory. Some modern processors provide a virtual address masking capability that allows application programs to store useful information in pointers, since the full (e.g., 64-bit) address space is rarely needed by application programs.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for memory management including dividing a memory into pools. Each pool includes blocks. The method further includes receiving a request to allocate a first block of a first size, selecting a pool based on the first size, allocating the first block from the selected pool, and creating metadata for a pointer to the first block. The pointer includes a pre-normalized address of the first block. The method further includes storing the metadata in the pointer, receiving a request to free the first block, and freeing the first block using the metadata to identify the selected pool.

In general, in one aspect, one or more embodiments relate to a system for memory management including a computer processor and a first memory including instructions that, when executed by the computer processor, cause the computer processor to divide a second memory into a plurality of pools. Each pool includes blocks. The instructions further include receiving a request to allocate a first block of a first size, selecting a pool based on the first size, allocating the first block from the selected pool, and creating metadata for a pointer to the first block. The pointer includes a pre-normalized address of the first block. The instructions further include storing the metadata in the pointer, receiving a request to free the first block, and freeing the first block using the metadata to identify the selected pool.

In general, in one aspect, one or more embodiments of the invention relate to a non-transitory computer readable medium including instructions that, when executed by a computer processor, perform a method for memory management including dividing a memory into pools. Each pool includes blocks. The method further includes receiving a request to allocate a first block of a first size, selecting a pool based on the first size, allocating the first block from the selected pool, and creating metadata for a pointer to the first block. The pointer includes a pre-normalized address of the first block. The method further includes storing the metadata in the pointer, receiving a request to free the first block, and freeing the first block using the metadata to identify the selected pool.

Other aspects of the invention will be apparent from the following description and the appended claims.

DETAILED DESCRIPTION

Figure 1:
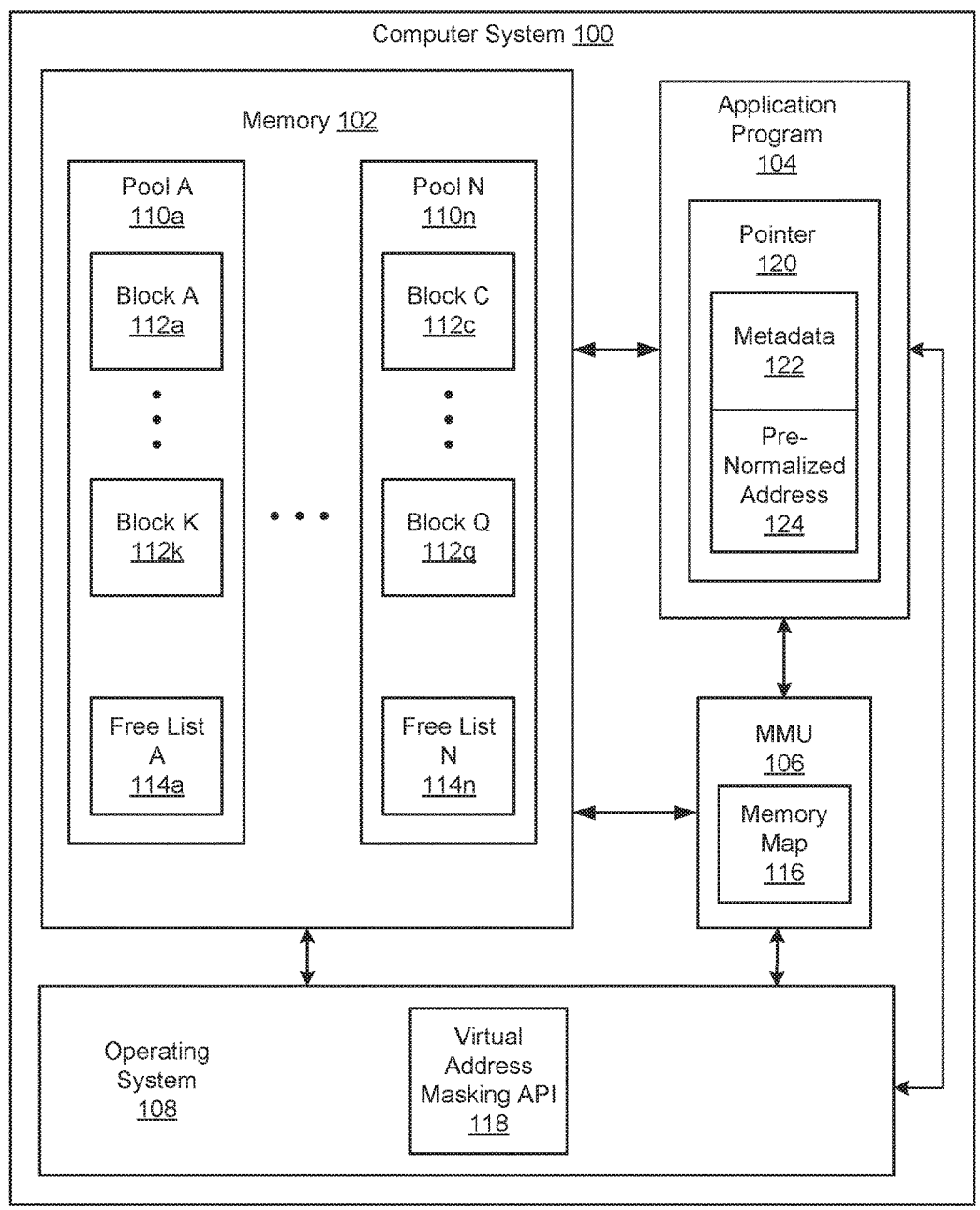
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system and non-transitory computer readable medium for memory management. In particular, one or more embodiments are directed to a method for allocating and freeing blocks of memory that are organized into pools. Metadata stored in a pointer to an allocated block may be used to identify the original pool from which the block was allocated, thereby avoiding the overhead of memory dereferencing when freeing the block. The metadata may contain information from which an address associated with the original pool may be computed or obtained (e.g., the size of the block). Storing metadata in a pointer may require a capability for virtual address masking (e.g., as provided on a SPARC M7/T7 processor), where specific bits in a pointer (e.g., the high 16 bits in a 64-bit pointer) may be reserved for use by an application program. The metadata may be ignored by the memory management unit (MMU) or processor when translating virtual addresses during the execution of load and store instructions. The metadata may be viewed as a cache with no overhead in the sense that the metadata may store a value that may be used to avoid memory dereferencing, without incurring the overhead of maintaining consistency or coherence (e.g., via locking) of the stored value.

FIG. 1 shows a system in accordance with one or more embodiments of the invention. As shown in FIG. 1, the system includes a computer system (100) that includes a memory (102), an application program (104), a memory management unit (MMU) (106) and an operating system (108). In one or more embodiments, the computer system (100) may be the computing system (500) described with respect to FIG. 5A and the accompanying description below, or may be the client device (526) described with respect to FIG. 5B. In one or more embodiments, the memory (102) may include the non-persistent storage (504) and/or the persistent storage (506) described with respect to FIG. 5A and the accompanying description below.

In one or more embodiments, the memory (102) may be divided into one or more pools (110a, 110n). Each pool (110a, 110n) may include one or more blocks (112a, 112c, 112k, 112q) and a free list (114a, 114n). In one or more embodiments, each block (112a, 112c, 112k, 112q) in a pool (110a, 110n) may be the same size (e.g., where the block size may be a power of 2). For example, pool A (110a) may include blocks (112a, 112k) of size 512 (2^9) bytes, while pool N (110n) may include blocks (112c, 112q) of size 4096 (2^12) bytes. In one or more embodiments, a given block size may be associated with a specific pool (110a, 110n). In one or more embodiments, the operating system (108) may use a slab memory allocator to create pools (110a, 110n) of identically-sized blocks (112a, 112c, 112k, 112q) in order to reduce memory fragmentation when the blocks (112a, 112c, 112k, 112q) are freed. A free list (114a, 114n) may be used to keep track of blocks (112a, 112c, 112k, 112q) that are available for allocation. In one or more embodiments, the pool (110a, 110n) with the smallest block size that equals or exceeds the requested block size may be selected to satisfy an allocation request (e.g., to reduce fragmentation).

In one or more embodiments, a free list (114a, 114n) for a pool (110a, 110n) may be implemented using a bit array with a bit indicating the status of each block (112a, 112c, 112k, 112q) in the pool (110a, 110n). For example, when a block (112a, 112c, 112k, 112q) is allocated, its corresponding bit may be set to "1", indicating that the block (112a, 112c, 112k, 112q) is in use, and when a block (112a, 112c, 112k, 112q) is freed, its corresponding bit may be set to "0", indicating that the block (112a, 112c, 112k, 112q) is available for subsequent allocation. In one or more embodiments, initially, each block (112a, 112c, 112k, 112q) in a given pool (110a, 110n) is in the free list (114a, 114n).

Continuing with FIG. 1, the computer system (100) may be configured to store and execute an application program (104). The application program (104) may be implemented in hardware (i.e., circuitry), software, or any combination thereof. In one or more embodiments, the application program (104) may be a collection of source code that may include various software components. That is, the application program (104) may be a collection of computer instructions written in a human-readable programming language. The application program (104) may be transformed by a compiler program into binary machine code. Compiled machine code may then be executed by the computer system (100) in order to execute the software components generated from the application program (104).

In one or more embodiments, the application program (104) may include one or more pointers (120) that reference one or more blocks (112a, 112c, 112k, 112q). For example, the application program (104) may request a block (112a, 112c, 112k, 112q) of a certain size from the operating system (108) (e.g., via a call to malloc) and obtain a pointer (120) to the allocated block (112a, 112c, 112k, 112q). Alternatively, the request for the block (112a, 112c, 112k, 112q) may be issued by a component of the operating system (108). The pointer (120) may include metadata (122) and a pre-normalized address (124). In one or more embodiments, the metadata (122) includes the high bits of the pointer (120), and may be reserved for use by the application program (104). For example, a 64-bit address space may be sufficiently large (e.g., a 40-bit address space covers over 1 terabyte) to permit some address bits to be reserved for use by application programs (104). For example, SPARC M7/T7 processors support a virtual address masking capability where a 64-bit pointer (120) may include up to 24 bits of metadata (122) reserved for use by application programs (104) (http://www.oracle.com/us/products/servers-storage/servers/sparc-enterprise/migration/m7-next-gen-sparc-presentation-2326292.html).

In one or more embodiments, the application program (104) may store an arbitrary value as metadata (122) in the upper bits of the pointer (120). For example, the application program (104) may allocate and initialize a mask that represents the metadata (122), and then use bitwise operators to write the mask onto the pointer (120). In one or more embodiments, the application program (104) may use a virtual address masking application programming interface (API) (118) of the operating system (108) to allocate and initialize the mask.

In one or more embodiments, the pointer (120) may be translated by the MMU (106) into a corresponding physical address. The MMU (106) may be implemented in hardware (i.e., circuitry), software, or any combination thereof. In one or more embodiments, the MMU (106) may use a memory map (116) to translate a pointer (120) into a physical address (e.g., corresponding to non-persistent storage (504) or persistent storage (506)). The memory map (116) may include one or more page tables to store mappings between pointers (120) and corresponding physical addresses. In one or more embodiments, the MMU (106) may include a translation lookaside buffer (TLB) (not shown) to cache the mapping of pointers (120) to physical addresses in order to reduce the number of page table references.

In one or more embodiments, the MMU (106) may be configured to normalize the pointer (120) during virtual address translation so that the metadata (122) has no impact during virtual address translation for instructions that reference the pointer (120) (e.g., load and store instructions). In one or more embodiments, a processor (e.g., the computer processor (502) described with respect to FIG. 5A) of the computer system (100) may be configured to normalize the pointer (120) during virtual address translation. In one or more embodiments, in order to preserve the apparent layout of a process (e.g., corresponding to the execution of the application program (104)) in its virtual address space, the pointer (120) may be normalized by sign-extending the most significant bit (MSB) of the pre-normalized address (124) to obtain a normalized address.

TABLE 1

| Masked Pointer | |
|---|---|
| Metadata (16 bits) | Pre-Normalized Address (48 bits) |
| 0f09 | f107 00c4 c111 |

TABLE 2

Normalized Pointer
Normalized Address (64 bits)

ffff f107 00c4 c111

For example, Table 1 above shows a 64-bit pointer (120) with 16 bits of metadata (122) and a 48-bit pre-normalized address (124) written in hexadecimal notation. Table 2 above shows the normalized address obtained by sign-extending the MSB (i.e., "1", since the pre-normalized address (124) in Table 1 begins with a hexadecimal "f") of the pre-normalized address (124), where all 16 bits (i.e., "ffff") of the metadata (122) are set to "1". The normalized address may then be used as the effective virtual address of the pointer (120).

Returning to FIG. 1, in one or more embodiments, as discussed previously, the operating system (108) may include functionality to allocate a block (112a, 112c, 112k, 112q) from a pool (110a, 110n) (e.g., when an application program (104) calls "malloc"). The operating system (108) may also include functionality to free a block (112a, 112c, 112k, 112q) (e.g., when an application program (104) calls "free") and return it to the original pool (110a, 110n) from which the block (112a, 112c, 112k, 112q) was allocated. In one or more embodiments, the original pool (110a, 110n) may be identified using the metadata (122) of the pointer (120) to the block (112a, 112c, 112k, 112q).

In one or more embodiments, the original pool (110a, 110n) may be identified using the memory map (116) that stores addresses of pools (110a, 110n) corresponding to various pointers (120). For example, the memory map (116) may link a pointer (120) to an address of a header or a free list (114a, 114n) associated with a pool (110a, 110n). In other words, the memory map (116) may function as a dictionary that associates pool (110a, 110n) addresses with pointers (120). In one or more embodiments, the memory map (116) may store information (e.g., the block size of the pool (110a, 110n)) from which an address of a pool (110a, 110n) corresponding to a pointer (120) may be computed or obtained. When the memory map (116) is not memory-resident, then dereferencing (e.g., potentially triggering page faults) may be required.

In one or more embodiments, the metadata (122) may include an address corresponding to the original pool (110a, 110n) that includes the block (112a, 112c, 112k, 112q) referenced by the pointer (120). In one or more embodiments, the metadata (122) may include the block size of the pool (110a, 110n), where the address of the original pool (110a, 110n) may be computed from its corresponding block size. In one or more embodiments, the metadata (122) may include an exponent (e.g., power of 2) that may be used to compute the block size of the pool (110a, 110n). For example, the exponent may be used as an index of the pool (110a, 110n) within an array of pools (110a, 110n) in order to facilitate quick access to the pool (110a, 110n). In one or more embodiments, the metadata (122) may include any type of information from which a block size or an address of the original pool (110a, 110n) may be computed.

In one or more embodiments, once the original pool (110a, 110n) has been identified, the block (112a, 112c, 112k, 112q) may be freed by adding the block (112a, 112c, 112k, 112q) to the free list (114a, 114n) of the original pool (110a, 110n), thereby making the now-freed block (112a, 112c, 112k, 112q) available for subsequent re-allocation.

Continuing with FIG. 1, in one or more embodiments, the operating system (108) may expose a virtual address masking API (118) that enables an application program (104) to create a mask corresponding to the metadata (122). The application program (104) may then store the metadata (122) in the unused (e.g., high) bit positions of the pointer (120) using bitwise operators (e.g., and, inclusive or, exclusive or, left shift, right shift, not) to set the unused bit values in the pointer (120) using the mask. For example, bitwise operators may be used to write "0f09" (hexadecimal) in the 16 high bits of the pointer (120) in Table 1 above.

In one or more embodiments, the virtual address masking API (118) may be used by the application program (104) to normalize the pointer (120) as described above and illustrated in Table 2. The virtual address masking API (118) may also be used to override the default behavior of the MMU (106) (and/or processor of the computer system (100)) and cause the metadata (122) to be used in pointer computations and/or comparisons, rather than normalizing the pointer (120).

In one or more embodiments, the pointer (120) may be normalized for most operations, with the following exceptions: the pointer (120) is the target of a control transfer instruction, such as a pointer to a function; the pointer (120) address is used in a pointer difference computation in which both operands are pointers; the pointer (120) address is passed as an argument to a system call; and the pointer (120) address is passed to a function in a library that may use the address in one of the above cases. In these cases, the application program (104) may explicitly normalize the pre-normalized address (124) of the pointer (120) as described above. Alternatively, the application program (104) may refrain from modifying the high bits of the pointer (120).

While FIG. 1 shows a configuration of components, other configurations may be used without departing from the scope of the invention. For example, various components may be combined to create a single component. As another example, the functionality performed by a single component may be performed by two or more components.

Figure 2:
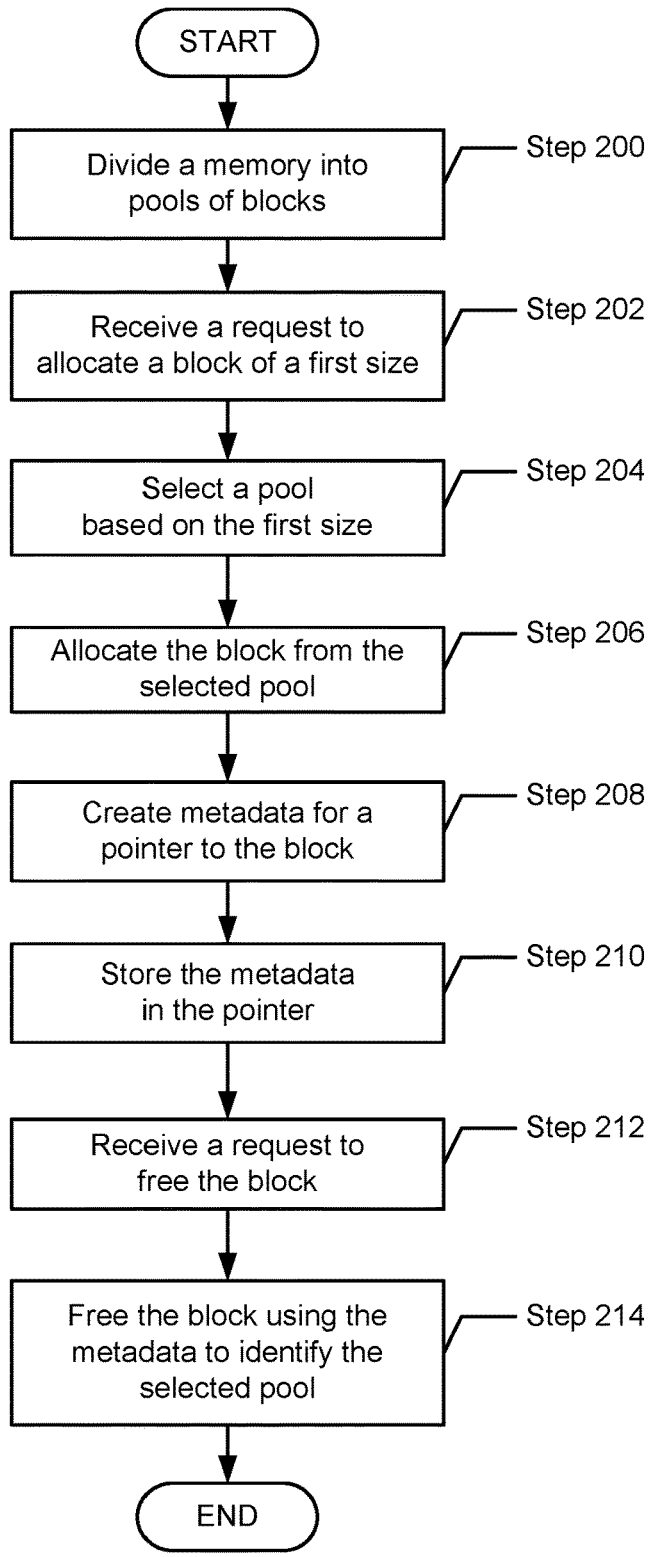
FIG. 2 and FIG. 3 show flowcharts in accordance with one or more embodiments of the invention.

FIG. 2 shows a flowchart in accordance with one or more embodiments. The flowchart depicts a process for memory management. One or more of the steps in FIG. 2 may be performed by the components of the computer system (100), discussed above in reference to FIG. 1. In one or more embodiments, one or more of the steps shown in FIG. 2 may be omitted, repeated, and/or performed in a different order than the order shown in FIG. 2. Accordingly, the scope of embodiments disclosed herein should not be considered limited to the specific arrangement of steps shown in FIG. 2.

Initially, in Step 200, a memory is divided into pools of blocks. In one or more embodiments, each block in a pool may be the same size, in order to reduce memory fragmentation when the blocks are freed. For example, an operating system may use a slab memory allocator to create different pools with different block sizes (e.g., where each block size may be a power of 2).

In Step 202, a request is received to allocate a block of a first size. In one or more embodiments, the request may be issued by an application program (e.g., via a call to malloc) or a component of an operating system.

In Step 204, a pool is selected based on the first size. In one or more embodiments, the pool with the smallest block size that equals or exceeds the first size is selected (e.g., to reduce fragmentation).

In Step 206, the block is allocated from the selected pool. In one or more embodiments, a pointer to the allocated block may be returned to the requestor (e.g., the application program) of the block. In one or more embodiments, the pointer may include unused bits (e.g., when the computer system supports a capability for virtual address masking) that are reserved for use by an application program.

In Step 208, metadata is created for a pointer to the block. In one or more embodiments, the metadata may include information that may be used to identify an address of the selected pool (e.g., to facilitate subsequent freeing of the block). For example, the metadata may include an address corresponding to the selected pool. Alternatively, the metadata may include the block size of the pool or any information (e.g., an exponent that represents a power of 2) from which the block size of the pool may be computed. For example, the exponent may be used as an index of the pool within an array of pools that facilitates quick access to the pool.

In Step 210, the metadata is stored in the pointer. In one or more embodiments, the metadata may be placed (e.g., by an application program) into the unused (e.g., high) bit positions of the pointer (e.g., if the computer system supports a capability for virtual address masking).

In Step 212, a request is received to free the block. In one or more embodiments, the request may be issued by an application program (e.g., via a call to "free") or a component of an operating system once the block is no longer needed.

In Step 214, the block is freed using the metadata to identify the selected pool. For example, the metadata may be an exponent that may be used as an index of the pool within an array of pools to facilitate quick access to the pool.

Figure 3:
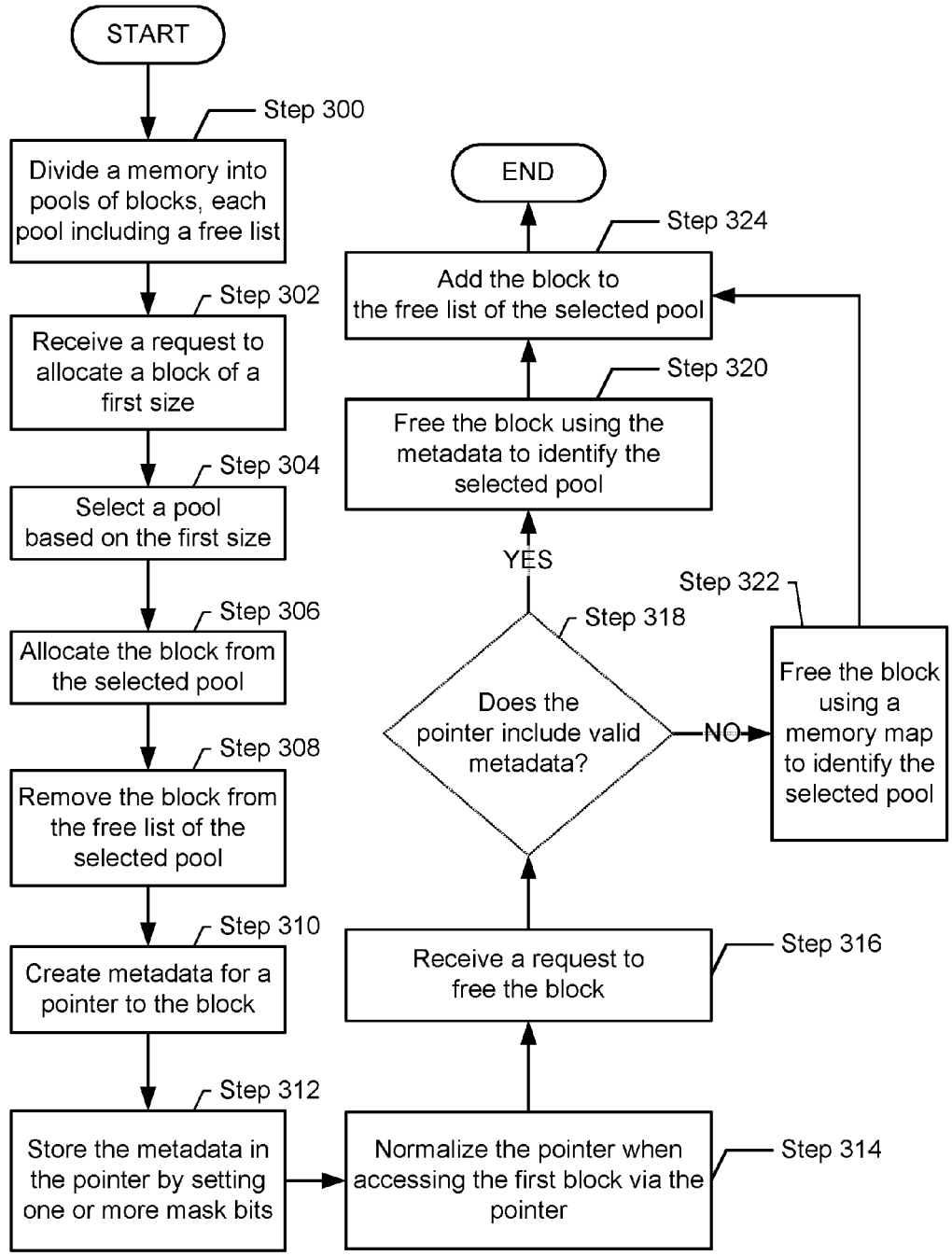

FIG. 3 shows a flowchart in accordance with one or more embodiments. The flowchart depicts a process for memory management. One or more of the steps in FIG. 3 may be performed by the components of the computer system (100), discussed above in reference to FIG. 1. In one or more embodiments, one or more of the steps shown in FIG. 3 may be omitted, repeated, and/or performed in a different order than the order shown in FIG. 3. Accordingly, the scope of embodiments disclosed herein should not be considered limited to the specific arrangement of steps shown in FIG. 3.

Initially, in Step 300, a memory is divided into pools of blocks (as discussed above in the description of Step 200) where each pool includes a free list. In one or more embodiments, the free list indicates available blocks in the pool. In one or more embodiments, the free list may be implemented using a bit array with a bit indicating the status of each block. For example, when a block is allocated, its corresponding bit may be set to "1," indicating that the block is in use, and when the block is freed, its corresponding bit may be set to "0," indicating that the block is available for subsequent allocation. Initially, each block in a given pool may be in the free list.

In Step 302, a request is received to allocate a block of a first size, as discussed above in the description of Step 202.

In Step 304, a pool is selected based on the first size, as discussed above in the description of Step 204.

In Step 306, the block is allocated from the selected pool, as discussed above in the description of Step 206.

In Step 308, the block is removed from the free list of the selected pool. That is, once the block is allocated, it is no longer available for subsequent allocation.

In Step 310, metadata is created for a pointer to the block, as discussed above in the description of Step 208. For example, an application program may create a mask (e.g., using a virtual address masking API) corresponding to the metadata.

In Step 312, the metadata is stored in the pointer by setting one or more mask bits. That is, in one or more embodiments, the pointer may include mask (i.e., unused) bits that are available for use by application programs (e.g., when the computer system supports a virtual address masking capability). For example, an application program may use bitwise operators to write the mask (created in Step 310 above) onto the pointer. In one or more embodiments, the application program may write the metadata into the unused (e.g., high) bit positions of the pointer.

In Step 314, the pointer is normalized when accessing the first block via the pointer. In one or more embodiments, a processor of the computer system may be configured to automatically normalize the pointer during virtual address translation (e.g., for load and store instructions). In one or more embodiments, the pointer may be normalized by sign-extending the MSB of the pre-normalized address of the pointer to obtain a normalized address. In one or more embodiments, an MMU of the computer system may be configured to automatically normalize the pointer during virtual address translation.

In Step 316, a request is received to free the block, as discussed above in the description of Step 212.

In Step 320, the block is freed using the metadata to identify the selected pool (as discussed above in the description of Step 214) if in Step 318 it is determined that the pointer includes valid metadata. That is, the metadata is valid if it may be used to identify the selected pool (i.e., the pool which includes the block to be freed). Otherwise, Step 322 below is performed.

In Step 322, the block is freed using a memory map to identify the selected pool. In one or more embodiments, the memory map may function as a dictionary that stores addresses of pools corresponding to various pointers. In one or more embodiments, the memory map may store information from which an address of a pool corresponding to a pointer may be computed or obtained.

In Step 324, the block is added to the free list of the selected pool. In one or more embodiments, the block's presence on the free list means that the block is available for subsequent re-allocation.

Figure 4:
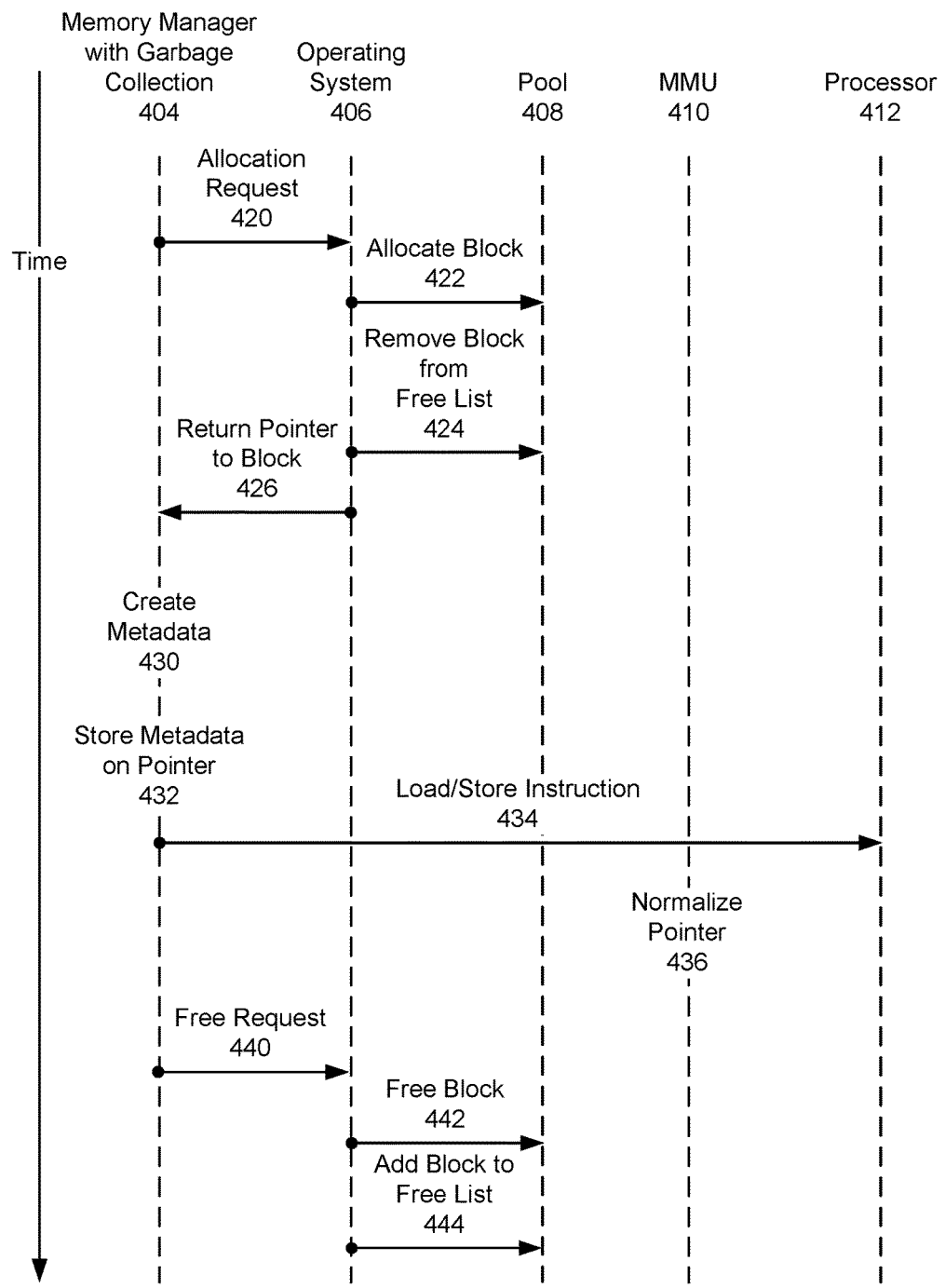
FIG. 4 shows an example in accordance with one or more embodiments of the invention.

The following example is for explanatory purposes only and not intended to limit the scope of the invention. FIG. 4 illustrates, in accordance with one or more embodiments, the relative timing of steps that may be performed by a memory manager with a garbage collection capability (404) (i.e., the application program (104) in FIG. 1), an operating system (406) ((108) in FIG. 1), a pool (408) ((110a, 110n) in FIG. 1), an MMU (410) ((106) in FIG. 1), and a processor (412) (e.g., (502) in FIG. 5A), in accordance with the flowcharts in FIG. 2 and FIG. 3. In this scenario, the memory manager (404) allocates and then efficiently frees a block leveraging a virtual address masking capability to store metadata on a pointer to the block.

In Step 420, an allocation request for a block of a certain size (e.g., via the statement "pointer=malloc(4096);") is sent from the memory manager (404) to the operating system (406). For example, the memory manager (404) may need to allocate various blocks to contain "younger generation" memory regions. In Step 422, the operating system (406) allocates the block from a pool (408) with the smallest block size (e.g., 4K bytes) equal to or exceeding the requested block size. In Step 424, the operating system (406) removes the block from the free list of the pool (408) indicating that the block is now allocated and therefore is no longer available. In Step 426, the operating system (406) returns a pointer to the allocated block to the memory manager (404).

In Step 430, the memory manager (404) creates metadata that may be used to identify an address of the pool (408). For example, the exponent 12 may be used to represent the block size of the pool (408), since 2^12=4096. Then an address (e.g., a header record) associated with the pool (408) may be computed based on the block size of the pool (408). Alternatively, the exponent 12 may be used as an index into an array of addresses corresponding to the various pools. The memory manager (404) then creates a mask for the metadata. In Step 432, the memory manager (404) uses bitwise operators to write the mask onto the pointer. In Step 434, the memory manager (404) issues an instruction (e.g., within an instruction sequence in application code) that accesses the pointer. The processor (412) may normalize the pointer (e.g., ignore the mask by sign-extending the MSB of the pre-normalized address in the pointer) before processing the instruction (i.e., provided that the processor (412) supports virtual address masking) so that the metadata has no impact during virtual address translation. Normalizing the pointer only impacts virtual address translation (i.e., the metadata of the pointer may be used in subsequent application instructions). For example, the instruction may store a value into the block using the pointer, or load a value from the block using the pointer. Alternatively, in Step 436, the MMU (410) may normalize the pointer during the virtual address translation of the pointer before the instruction issued in Step 434 above is executed.

In Step 440, the memory manager (404) sends a request to free the block (e.g., via the statement "free(pointer);") to the operating system (406). For example, the memory manager (404) may need to free various blocks that contained "older generation" memory regions. In Step 442, the operating system (406) frees the block from the pool (408) using the metadata to identify the pool (408). Alternatively, if the metadata is omitted, or fails to identify an address of the pool (408), then a memory map of the MMU (410) may be used to identify the address of the pool (408), which may incur a cache miss if the relevant entry is not cached, or a page fault if the relevant page table entry is not in memory-resident. In Step 444, the operating system (406) adds the block to the free list of the pool (408) indicating that the block is again available for allocation.

Performance analyses have shown that identifying the correct pool via memory dereferencing consumes the majority of time in a free operation. That is, memory dereferencing is the critical path, and other computations are relatively quick in comparison. The root cause of the performance improvement of the processes shown in FIG. 2 and FIG. 3 is leveraging metadata stored in pointers to avoid memory dereferencing when freeing a block. This performance improvement may be especially significant when the allocation pattern of an application is such that a significant part of the allocated memory is not freed shortly after its allocation, so that memory regions to be freed may no longer be cache-resident (or even page table-resident), resulting in cache misses and/or page faults which degrade performance.

Two performance benchmarks of the processes shown in FIG. 2 and FIG. 3 were run. A straightforward benchmark based on a partial optimization of a widely used allocation library using a simple pattern of allocating and freeing blocks resulted in a 25-45% reduction in the time required for free operations. In contrast, a second benchmark running the same allocation pattern, using a simplified memory management mechanism resulted in a 3×-5× reduction in the time required for free operations. The performance of the processes shown in FIG. 2 and FIG. 3 may be further improved by tuning the size of the metadata and/or block sizes based on performance analyses conducted on different-sized metadata (i.e., the number of bits reserved for metadata) and different pool block sizes.

Figure 5A:
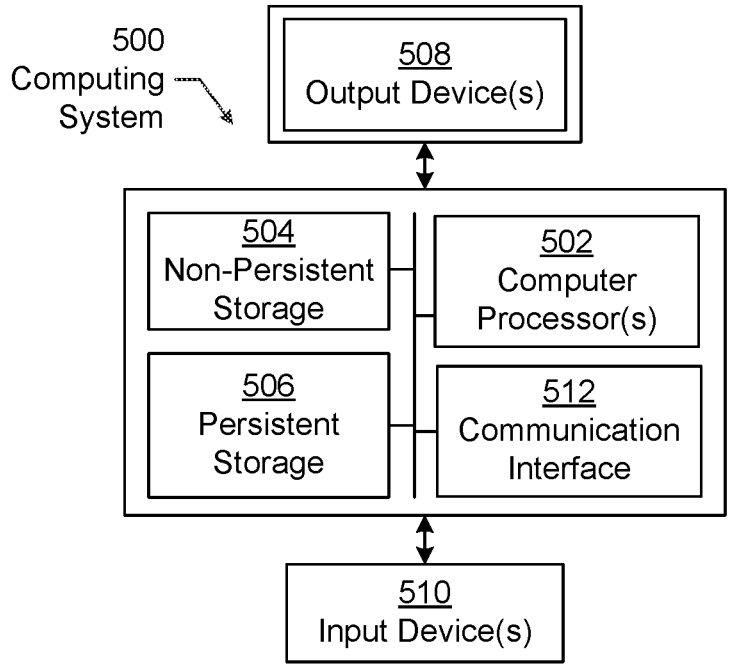
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
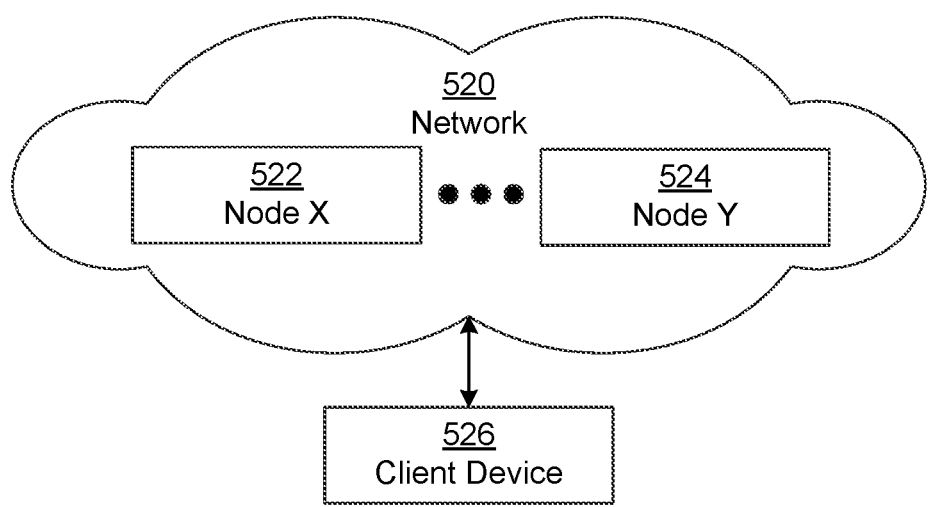

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for memory management, comprising:
dividing a memory into a plurality of pools, each pool comprising a plurality of blocks and a free list indicating available blocks in the pool;
receiving a request to allocate a first block of a first size;
selecting, based on the first size, a pool of the plurality of pools;
allocating the first block from the selected pool by removing the first block from the free list of the selected pool;
creating metadata for a pointer to the first block, the pointer comprising an address of the first block and one or more mask bits;
storing the metadata in the pointer by setting the one or more mask bits to correspond to the metadata;
accessing the first block via the pointer by ignoring the metadata during virtual address translation of an instruction that references the pointer;
receiving a request to free the first block; and
freeing the first block using the metadata to identify the selected pool.

2. The method of claim 1, further comprising:
normalizing the pointer when accessing the first block via the pointer.

3. The method of claim 2,
wherein normalizing the pointer comprises setting the one or more mask bits to a most significant bit of the address of the pointer.

4. The method of claim 1,
wherein freeing the first block comprises adding the first block to the free list of the selected pool, and
wherein the first size does not exceed a size of the first block.

5. The method of claim 1, wherein the metadata comprises a value from which the size of the first block may be computed, and wherein the selected pool may be identified using the size of the first block.

6. The method of claim 5, wherein the value is used as an exponent.

7. A system for memory management, comprising:
a computer processor; and
a first memory comprising instructions that, when executed by the computer processor, cause the computer processor to:
- divide a second memory into a plurality of pools, each pool comprising a plurality of blocks and a free list indicating available blocks in the pool;
- receive a request to allocate a first block of a first size;
- select, based on the first size, a pool of the plurality of pools;
- allocate the first block from the selected pool by removing the first block from the free list of the selected pool;
- create metadata for a pointer to the first block, the pointer comprising an address of the first block and one or more mask bits;
- store the metadata in the pointer by setting the one or more mask bits to correspond to the metadata;
- access the first block via the pointer by ignoring the metadata during virtual address translation of an instruction that references the pointer;
- receive a request to free the first block; and
- free the first block using the metadata to identify the selected pool.

8. The system of claim 7, wherein the first memory further comprises instructions that, when executed by the computer processor, cause the computer processor to normalize the pointer when accessing the first block via the pointer.

9. The system of claim 8,
wherein normalizing the pointer comprises setting the one or more mask bits to a most significant bit (MSB) of the address of the pointer.

10. The system of claim 7,
wherein freeing the first block comprises adding the first block to the free list of the selected pool, and
wherein the first size does not exceed a size of the first block.

11. The system of claim 7, wherein the metadata comprises a value from which the size of the first block may be computed, and wherein the selected pool may be identified using the size of the first block.

12. The system of claim 11, wherein the value is used as an exponent.

13. A non-transitory computer readable medium comprising instructions that, when executed by a computer processor, perform a method for memory management, the method comprising:
- dividing a memory into a plurality of pools, each pool comprising a plurality of blocks and a free list indicating available blocks in the pool;
- receiving a request to allocate a first block of a first size;
- selecting, based on the first size, a pool of the plurality of pools;
- allocating the first block from the selected pool by removing the first block from the free list of the selected pool;
- creating metadata for a pointer to the first block, the pointer comprising an address of the first block and one or more mask bits;
- storing the metadata in the pointer by setting the one or more mask bits to correspond to the metadata;
- accessing the first block via the pointer by ignoring the metadata during virtual address translation of an instruction that references the pointer;
- receiving a request to free the first block; and
- freeing the first block using the metadata to identify the selected pool.

14. The non-transitory computer readable medium of claim 13, wherein the method further comprises normalizing the pointer when accessing the first block via the pointer.

15. The non-transitory computer readable medium of claim 14,
wherein normalizing the pointer comprises setting the one or more mask bits to a most significant bit (MSB) of the address of the pointer.

16. The non-transitory computer readable medium of claim 13,
wherein freeing the first block comprises adding the first block to the free list of the selected pool, and
wherein the first size does not exceed a size of the first block.

17. The non-transitory computer readable medium of claim 13, wherein the metadata comprises a value from which the size of the first block may be computed, and wherein the selected pool may be identified using the size of the first block.

18. The non-transitory computer readable medium of claim 17, wherein the value is used as an exponent.

* * * * *